A. GREBE.
BORESIGHT.
APPLICATION FILED DEC. 11, 1913.
1,195,353.
Patented Aug. 22, 1916.
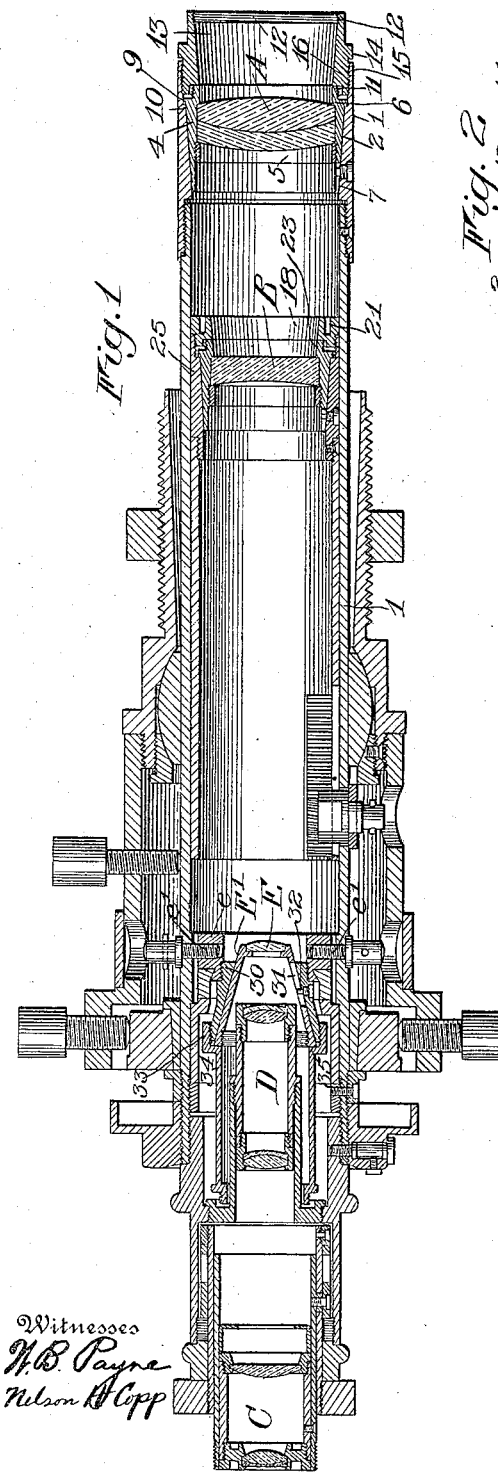
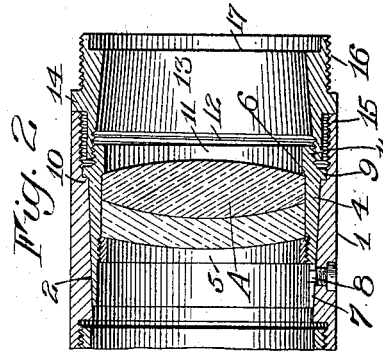
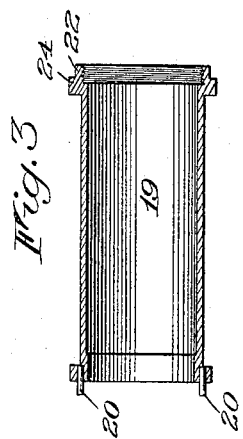
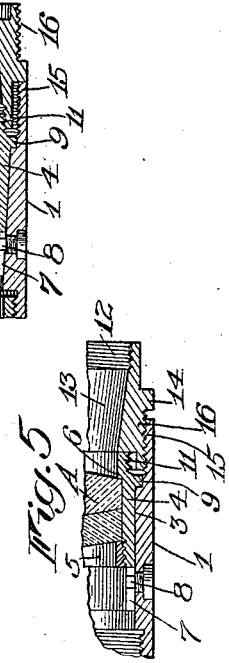
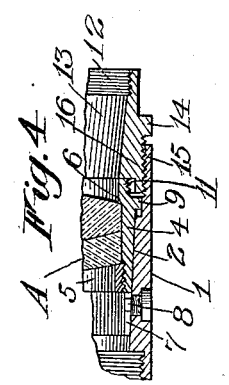
Witnesses
W. B. Payne
Nelson H. Copp
Inventor
Albert Grebe
By Church & Rich
Attorneys

UNITED STATES PATENT OFFICE.

ALBERT GREBE, OF ROCHESTER, NEW YORK, ASSIGNOR TO BAUSCH & LOMB OPTICAL COMPANY, OF ROCHESTER, NEW YORK, A CORPORATION OF NEW YORK.

BORESIGHT.

1,195,353.   Specification of Letters Patent.   Patented Aug. 22, 1916.

Application filed December 11, 1913. Serial No. 806,068.

*To all whom it may concern:*

Be it known that I, ALBERT GREBE, of Rochester, in the county of Monroe and State of New York, have invented certain new and useful Improvements in Boresights; and I do hereby declare the following to be a full, clear, and exact description of the same, reference being had to the accompanying drawings, forming a part of this specification, and to the reference-numerals marked thereon.

My present invention relates to optical instruments and particularly those known as boresights, which are employed for accurately determining the axis of the bore of a gun or cannon, and it has for its object to provide a new and improved mounting for the objective and focusing lenses and the cross-hairs, whereby these may be easily removed and inserted and when replaced will all occupy their original precise positions.

To these and other ends the invention consists in certain improvements and combinations of parts, all as will be hereinafter more fully described, the novel features being pointed out in the claims at the end of the specification.

In the drawings: Figure 1 is a longitudinal sectional view of a telescope or boresight showing the mounting for the lenses and cross-hair glass constructed in accordance with my invention; Fig. 2 is an enlarged sectional view showing the operation of the member or tool employed for removing a mounting; Fig. 3 is a detail view of the tool employed for inserting or removing the mounting of one of the focusing lenses of the instrument, and Figs. 4 and 5 are detail sectional views illustrating different means of securing the mountings in the telescope tube.

Similar reference numerals throughout the several figures indicate the same parts.

In illustrating my invention I have shown it as applied to a boresight, or a more telescope, because of the fact that in an instrument of this kind it is particularly necessary to preserve a very accurate positioning of the lenses and cross-hairs to maintain a perfect line of collimation after the cross-hairs have been adjusted in the first instance. Mountings made in accordance with my invention are designed to permit the removal of the objective and focusing lenses at one end of the telescope and the cross-hair mounting at the other end thereof to facilitate the cleaning of the lenses and the cross-hair glass and to insure these parts being secured in their original positions when restored to the telescope tube. The boresight or telescope may be of the usual or any preferred construction, as an example of which reference is made to Letters Patent No. 803,435, granted under date of October 31, 1905, to George N. Saegmuller.

In the illustration, the instrument shown comprises the shell or tube 1 provided at the outer end with the objective and focusing lenses A and B and at its rear end with the eyepiece C. With these lenses coöperates the interiorly disposed erecting system of lenses D. In front of the latter are placed the cross-hairs, which, in the type of instrument shown, are provided on the face of a glass E, carried in a mounting E' which is adjustable both horizontally and vertically by any suitable means, such as the transversely movable slides *e* which are regulated by adjusting screws *e'*, by means of which the point of intersection of the cross-hairs is positioned in proper axial alinement with all of the lenses when they are secured in their permanent positions.

The two essential characteristics of a mounting embodying my invention consists in providing a seat which insures the lens being replaced in its original position after having been withdrawn without rotation, and means for removing and inserting it in the telescope tube and locking it in position therein. To these ends I provide the tube 1 with a smooth interior surface which may be either conical, as indicated in Figs. 2 and 4, or cylindrical, as indicated by 3 in Fig. 5, with which coöperates a corresponding outer surface on the lens mount or ring 4. The lenses are rigidly secured in the ring 4 by means of a collar 5 threaded on the interior of the ring and engaging their inner edges and to force their opposite edges into contact with a shoulder 6. To prevent a lens from being rotated and inserted in the telescope tube in a new or different position, said tube and mount are provided one with a slot and the other with a coöperating projection, in the present instance the slot being shown as formed in the inner edge of the ring 4, as indicated by 7, and coöperating with the projection 8 formed by the inner end or tip of the screw inserted from the exterior of the tube. When the engaging surfaces of the tube and lens mount are tapered the frictional engagement between them may be utilized to limit the inward movement of the lens and its mount, as shown in Fig. 4, although I prefer to provide the latter with an annular flange 9 forming an abutment, which when the mount is in its proper position will engage a correspondingly formed shoulder 10 on the shell or tube 1, because it forms a further safeguard in accurately determining the longitudinal position of the lens and prevents the latter from being affected in any way by a too severe crowding of the lens mount into frictional contact with the surface 2. In the arrangement of the parts shown in Fig. 5, the coöperating flange and shoulder on the lens mount and tube, respectively, determine the longitudinal position of the lens in the tube.

A further feature of my invention consists in providing a convenient means for extracting the lens mount and of providing an extractor in the form of a cylindrical collar which may be normally utilized as a ferrule, strengthening the outer end of the telescope tube and as a locking ring for holding the lens mount in place. The ring may be removed from the end of the tube and replaced thereon in reversed position and utilized to withdraw the lens mount and perform the further function of a handle or support for said parts when detached.

On the outer or forward end of the mount or ring 4, I provide the rim 11 which is screw threaded exteriorly and coöperates with the interior screw threads 12 on the extractor or lens removing member 13, when the latter is placed in its reversed position, as shown in Fig. 2. The member 13 has an outer flange or collar 14, the face of which abuts against the end of the tube 1 to limit its longitudinal movement thereon and to compel the lens mount 4 to be dislodged when said member is rotated by reason of the force exerted by the screw threads 12. The end of the tube 1 beyond the shoulder 10 is provided with the interior screw threads 15 which are adapted to receive the exterior thread 16 on the member 13 when this is in the normal position shown in Fig. 1. The extractor or member 13 when in its normal position also serves to hold the lens mount in firm engagement with its seat and for this reason it is provided at its inner edge with an annular recess 17 which receives the rim 11, the bottom of said recess abutting against the face of the rim, as shown in Figs. 1, 4 and 5.

In telescope constructions where a focusing lens, such as B, is employed which is located at a point some distance within the end of the tube or casing 1, the same type of mounting may be used as that employed for positioning the objective lens A. In such instances, however, it is necessary to employ a locking ring, such as 18, for holding the mounting in place which fits wholly within the tube 1. In order to remove this ring and to extract the mounting of the lens B, I employ a tool preferably of the form shown in Fig. 3, comprising a tube 19 having at one end pins or projections 20 which are adapted to enter recesses 21 in the collar 18 and act as a wrench by means of which it may be unscrewed and withdrawn. On the opposite extremity of the tube 19 is the threaded portion 22 which is adapted to engage with the threaded rim 23 of the lens mount and the collar 24 which frictionally bears against the end of the outer member or sleeve 25 in which the mounting is seated.

The laterally adjustable mounting of the cross hair support E is arranged similarly to the lens mounts previously described, and comprises the conical sleeve 30, carried by one of the slides e, into which is fitted the tubular mount E. The latter is positioned circumferentially by the slot 31 and coöperating pin 32. The sleeve 30, it will be noted, is threaded exteriorly and supports the threaded end 33 of the combined holder and extractor tube 34 having a shoulder 35 which engages the outer end of the tube E and holds it seated in the sleeve 30. The other end of the tube 34 is provided with a reduced portion which is threaded and adapted to coöperate with the cross hair mount E when it is desired to remove it. This operation, it will, of course, be understood is performed after the eyepiece lenses and erecting system have been removed.

The mountings embodying my invention greatly enhance the usefulness and value of an instrument in which it is necessary to maintain accurate collimation, as they provide means whereby the lenses and cross hair carrier may be removed and cleaned to improve the clearness of view and sharpness of image.

I claim as my invention:

1. The combination with a tubular member having a seating surface formed therein and spaced from the end of the member and a mounting member fitting said surface and having a portion provided with screw threads, of an extractor for withdrawing the mounting member arranged to bear against the end of the seat member and having a portion adapted to extend within said seat member and provided with screw threads which coöperate with those of the mounting member to impart a relative longitudinal movement thereto.

2. The combination with a tubular member having a threaded end and provided with a seating surface spaced from the end beyond said threads, of a mounting member fitting within said surface and having a threaded portion, a collar having a threaded portion by means of which it may be secured on the seat member and provided with a second threaded portion which, when the collar is reversed, is adapted to coöperate with the threads of the mounting member and a bearing flange on the collar adapted to engage the outer end of the seat member when said collar is in the last mentioned position.

3. The combination with a tubular member having an interior threaded end and a seating surface spaced from the end beyond said threads, of a mounting ring engaging said surface having an exteriorly threaded outer end, of a collar having interior and exterior threaded portions at its two ends adapted to coöperate alternately with the threads on the tubular member and ring and a flange on the collar adapted to engage the edge of the tubular member when one of its threaded portions engages the threads of said mounting ring.

ALBERT GREBE.

Witnesses:
WILLIAM G. WOODWORTH,
DANIEL M. SMITH.

Copies of this patent may be obtained for five cents each, by addressing the "Commissioner of Patents, Washington, D. C."